US005541408A

United States Patent [19]

Sittler

[11] Patent Number: 5,541,408

[45] Date of Patent: Jul. 30, 1996

[54] MICROMACHINED MASS SPECTROMETER

[75] Inventor: Fred C. Sittler, Victoria, Minn.

[73] Assignee: Rosemount Analytical Inc., Eden Prairie, Minn.

[21] Appl. No.: 390,493

[22] Filed: Feb. 17, 1995

Related U.S. Application Data

[63] Continuation of Ser. No. 146,220, Nov. 1, 1993, Pat. No. 5,401,963.

[51] Int. Cl.[6] ............................ B01D 59/44; H01J 49/00

[52] U.S. Cl. ........................................ 250/288; 250/423 F

[58] Field of Search .................................... 250/281, 288, 250/423 P

[56] References Cited

U.S. PATENT DOCUMENTS

| | | | |
|---|---|---|---|
| 3,555,273 | 1/1971 | Arnold | 250/41.9 |
| 3,852,595 | 12/1974 | Aberth | 250/288 |
| 3,889,711 | 6/1975 | Hirao | 137/599 |
| 3,925,662 | 12/1975 | Dawson | 250/290 |
| 3,934,611 | 1/1976 | Gachot et al. | 137/608 |
| 4,141,405 | 2/1979 | Spindt | 164/46 |
| 4,304,260 | 12/1981 | Turner et al. | 137/613 |
| 4,333,500 | 6/1982 | Broerman | 137/863 |
| 4,368,755 | 1/1983 | King | 137/512.3 |
| 4,641,034 | 2/1987 | Okamura et al. | 250/492.2 |
| 4,647,013 | 3/1987 | Giachino et al. | 251/331 |
| 4,768,751 | 9/1988 | Giachino et al. | 251/331 |
| 4,850,371 | 7/1989 | Broadhurst et al. | 128/719 |
| 4,866,267 | 9/1989 | Matsuda et al. | 250/296 |
| 4,885,500 | 12/1989 | Hansen et al. | 313/256 |
| 4,892,709 | 1/1990 | Frese, Jr. | 422/98 |
| 4,926,056 | 5/1990 | Spindt | 250/423 F |
| 4,947,041 | 8/1990 | Taya | 250/298 |
| 4,948,962 | 8/1990 | Mitsui et al. | 250/288 |
| 4,966,141 | 10/1990 | Bacaner et al. | 128/207.14 |
| 4,988,869 | 1/1991 | Aberth | 250/281 |
| 4,994,676 | 2/1991 | Mount | 250/298 |
| 4,996,422 | 2/1991 | Mitsui et al. | 250/281 |
| 4,996,424 | 2/1991 | Mimura et al. | 250/288 |
| 5,015,845 | 5/1991 | Allen et al. | 250/288 |
| 5,015,848 | 5/1991 | Bomse et al. | 250/281 |
| 5,026,987 | 6/1991 | Bier et al. | 250/281 |
| 5,036,195 | 7/1991 | Batey et al. | 250/288 |

(List continued on next page.)

FOREIGN PATENT DOCUMENTS

| | | |
|---|---|---|
| 2657999 | 9/1991 | France . |
| 4-267045A | 9/1992 | Japan . |
| 5-174703A | 7/1993 | Japan . |

OTHER PUBLICATIONS

C. C. Curtis and K. C. Hsieh, "Review of Scientific Instruments—Spacecraft Mass Spectrometer Ion Source employing Field Emission Cathodes", *American Institute of Physics,* vol. 57, No. 5, 1986, pp. 989–990.

N. G. Adams and D. Smith, "A multicollector, cycloidal focusing, magnetic mass spectrometer", *Journal of Physics E. Scientific Instruments,* vol. 7, No. 9, Sep. 1974, pp. 759–768.

"Microminiaturization of Electron Optical Systems", T. H. P. Chang et al. J., Vacuum Sci. & Tech. (B), vol. 8, No. 6, Nov./Dec., 1990; pp. 1698–1705.

"High–Energy Product Sm–Co–Based Sputtered Films, Crystal Texturing, and Magnetic Properties,"F. J. Cadieu et al., J. Appl. Phys. 67(a), 1 May 1990, pp. 4969–4971.

*Primary Examiner*—Bruce C. Anderson

*Attorney, Agent, or Firm*—Westman, Champlin & Kelly, P.A.

[57] ABSTRACT

A micromachined mass spectrometer includes an ionizer, a separation region and a detector. The ionizer is formed from an upper electrode, a center electrode and a lower electrode. Ionization of a sample gas takes place around an edge of the center electrode. Accelerating electrodes extract ionized particles from the ionizer. Ionized particles are accelerated through the separation region. A magnetic field is applied in a direction perpendicular to travel of the ionized particles through the separation region causing the trajectory of the ionized particles to bend. The mass spectrometer is formed using micromachined techniques and is carried on a single substrate.

32 Claims, 7 Drawing Sheets

U.S. PATENT DOCUMENTS

| | | | |
|---|---|---|---|
| 5,043,576 | 8/1991 | Broadhurst et al. | 250/293 |
| 5,072,115 | 12/1991 | Zhou | 250/281 |
| 5,091,645 | 2/1992 | Elliott | 250/305 |
| 5,245,192 | 9/1993 | Houseman | 250/423 R |
| 5,245,247 | 9/1993 | Hosogi | 313/309 |
| 5,267,884 | 12/1993 | Hosogi | 445/24 |
| 5,386,115 | 1/1995 | Freidhoffs et al. | 250/281 |

MICROMACHINED MASS SPECTROMETER

This is a Continuation of application Ser. No. 08/146,220, filed Nov. 1, 1993, now U.S. Pat. No. 5,401,963. Priority of the prior application is claimed pursuant to 35 USC §120.

BACKGROUND OF THE INVENTION

The present invention relates to mass spectrometers for analysis of fluid (including gas) samples. More specifically, the invention relates to a micromachined mass spectrometer.

Mass spectrometers analyze a sample by ionizing at least some of the atoms or molecules making up the sample, and then isolating and detecting those ionized atoms or molecules that have a selected charge-to-mass ratio.

Broadhurst et al. teach a miniature motor pump mass spectrometer in U.S. Pat. No. 5,043,576. This spectrometer, however, is made up of many intricate and discrete components in a way which requires labor-intensive manufacturing and which reduces reliability. Spindt teaches, in U.S. Pat. No. 4,926,056, a microelectronic field ionizer fabricated with the techniques typically used to fabricate integrated circuitry. This field ionizer comprises a planar substrate having a gas outlet defined by a layer of electrically conductive material and another electrically conductive material on the substrate adjacent the outlet. The patent also teaches the use of an ion source array in an ion mobility spectrometer. However, the patent does not teach how to incorporate the field ionizer into a micromachined mass spectrometer.

BRIEF SUMMARY OF THE INVENTION

One aspect of the present invention relates to a miniature mass spectrometer wherein an ionizer and an ion detector are disposed on a shared substrate. The ionizer is preferably elongated along a first axis, and the ion detector is elongated along a second axis. In one embodiment, the first and second axis are substantially parallel to each other and to the substrate. The substrate is preferably composed of a brittle material such as silicon.

DETAILED DESCRIPTION OF THE PREFERRED EMBODIMENTS

In the context of this disclosure, the term "micromachined" used in connection with a device refers to a device the fabrication of which can include processes similar to those used in fabricating integrated circuits or silicon micromechanical devices, such as photolithography, chemical etching, vitreous molding, and other similar processes known to those skilled in the art.

Figure 1:
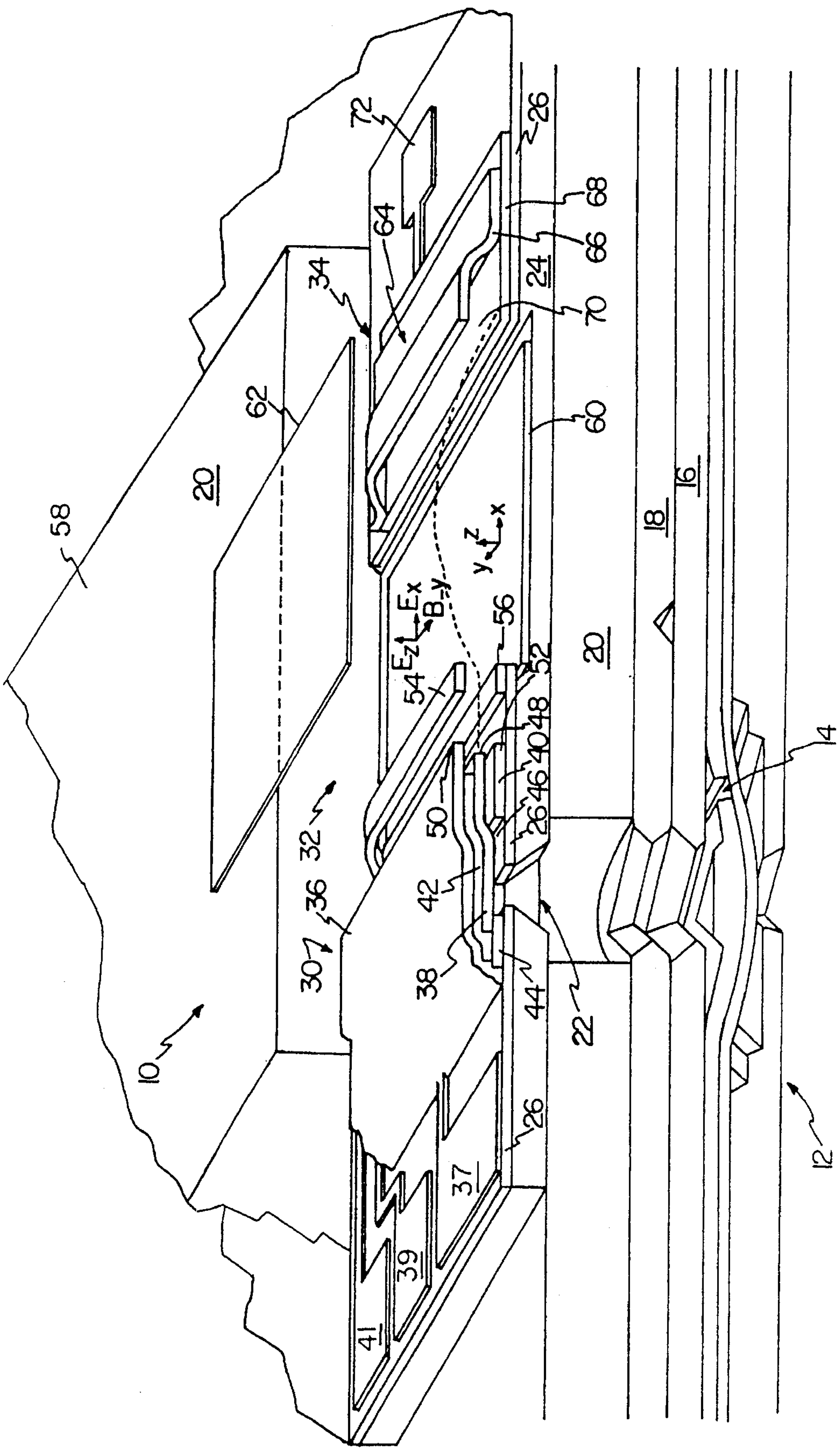
FIG. 1 is a partial cut-away view of a mass spectrometer in accordance with the invention.

FIG. 1 shows a cutaway perspective view of a mass spectrometer 10 and a valve apparatus 12. A disk-shaped metal plate 20 separates mass spectrometer 10 from valve apparatus 12. Valve apparatus 12 is shown in an "open" state, wherein a small quantity of fluid sample to be analyzed is allowed to escape from a channel 14 through openings in substrates 16, 18, and through a bore in plate 20 before reaching mass spectrometer 10. The sample enters mass spectrometer 10 through a port 22 in a brittle substrate 24, which is preferably single crystal silicon. For clarity, the vertical dimensions of the layers and other structures on substrate 24 are exaggerated.

Reference will be made to mutually orthogonal axes x, y, and z, oriented as shown in FIG. 1. Mass spectrometer 10 receives the small quantity of fluid sample to be analyzed through port 22 in substrate 24. Mass spectrometer 10 includes an ionizer 30, an ion separation region 32, and an ion detector 34. Ionizer 30 ionizes at least some of the atoms or molecules making up the sample, thereby producing ionized particles representative of the sample. In separation region 32, electric and/or magnetic fields act on the ionized particles to distinguish ionized particles having a desired charge-to-mass ratio from ionized particles having different charge-to-mass ratios. Ion detector 34 is fabricated and positioned to detect ionized particles having substantially only the desired charge-to-mass ratio.

Figure 8:
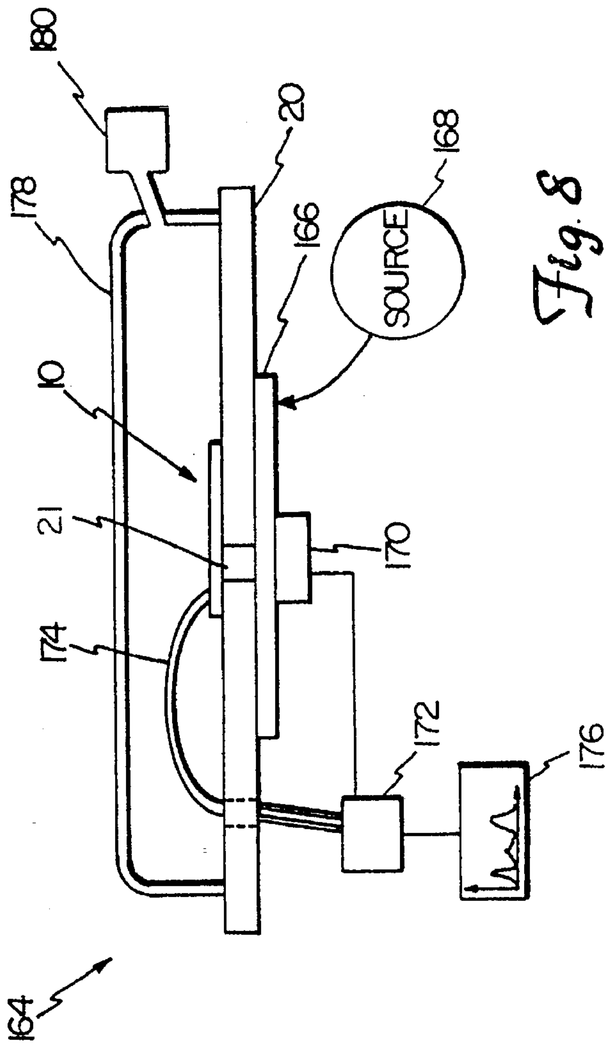
FIG. 8 shows a mass spectrometer system in accordance with the invention.

A diagrammatic sectional view of a mass spectrometer system incorporating a micro-machined mass spectrometer of the present invention is illustrated in FIG. 8. The mass spectrometer system 164 generally includes an outer housing 178 hermetically sealed to the plate 20 and connected to a suitable vacuum system 180 to maintain an inner region bounded by the outer housing and the plate 20 at a suitable reduced pressure. The micro-machined mass spectrometer 10 is joined to the base plate overlying a connecting port 21 through which a sample portion of the gas to be tested is provided. A suitable valve assembly 166 (such as described and illustrated in "Improved Micromachined Valve Assembly," U.S. patent application Ser. No. 08/126,336, filed on Sep. 24, 1993, and assigned to the same assignee as the present application and which is hereby incorporated by reference) is connected to a source reservoir 168 or process line in which the gas to be tested is contained.

Mass spectrometers, generally, utilize one of two types of ionizers: field ionizers or electron impact ionizers. In a field ionizer, conductors are configured to produce a high electric field (for example, $10^8$ V/m or more) when an electric potential is applied across the conductors. The sample to be analyzed is made to pass through the field, and, by a tunneling effect, the strong electric field strips electrons from some of the atoms or molecules making up the sample, thereby producing positive ions. In an electron impact ionizer, a source of (usually thermally generated) free electrons is coupled to an apparatus for accelerating the free electrons through a volume. The sample passes through the volume, and electrons collide with atoms or molecules of the sample, ionizing them.

One disadvantage of electron impact ionizers is their tendency to break apart, or fragment, molecules of the sample by the impact of the high energy electrons. Another disadvantage of electron impact ionizers is their tendency to add kinetic energy to the ionized particles, which degrades performance of the mass spectrometer by increasing variations in initial conditions of the ions.

Ionizer 30 is preferably configured as a field ionizer. Ionizer 30 includes upper electrode 36, center electrode 38, and lower electrode 40. Electrode 36 couples to contact 37, electrode 40 connects to contact 39, and accelerating electrode 54 connects to contact 41. Gap 42 electrically isolates upper electrode 36 from center electrode 38. Insulating layer 26 electrically isolates lower electrode 40, and other conductors disposed on substrate 24, from the substrate 24. Insulating layer 44 acts as a spacer so that center electrode 38 does not block passage of the fluid sample between port 22 and the remainder of mass spectrometer 10. Insulating layer 26 preferably comprises an oxide of substrate 24; for a substrate of silicon, insulating layer 26 is composed of silicon dioxide. Insulating layer 44 preferably comprises silicon dioxide, but can be made of metal oxides such as alumina ($Al_2O_3$), or other suitable insulators. Electrodes 36, 38 and 40 comprise electrical conductors such as platinum, gold, aluminum, nickel-chromium alloy, or the like. Electrodes 36, 38 and 40 and layer 44 are evaporated, sputtered, or otherwise deposited on substrate 24 and photoshaped with conventional micromachining processes.

The gas sample traverses ionizer 30 as follows. After passing through port 22, the sample enters passage 46 bounded above by a lower surface of center electrode 38, bounded below by an upper surface of insulating layer 26 and by an upper surface of lower electrode 40, and bounded laterally by downward-sloping ends of center electrode 38. As the sample flows through passage 46 from port 22, it expands laterally along the y-axis as it advances generally along the x-axis. As the sample exits passage 46, it passes close to an edge 48 of center electrode 38. An ionizing electric field is generated at edge 48 by application of an electric potential between electrodes 36,40 and center electrode 38. The strong electric field at edge 48 ionizes particles in a thin elongated strip extending parallel to the y-axis and proximate edge 48. The lateral dimension of field ionizer 30 (parallel to the y-axis) can be extended as desired, thereby lengthening the strip of ionized particles. Preferred dimensions of various structures are as follows: height of passage 46 (measured parallel to the z-axis), 150 nanometers; length of passage 46 from port 22 to center electrode edge 48, 30 micrometers; width of passage 46 (measured parallel to the y-axis), 5 micrometers.

The ionized particles produced at edge 48 of center electrode 38, although drifting generally in the x-direction, have a nearly random distribution of initial velocities. Edge 48 is recessed relative to edges 50,52 of upper and lower electrodes 36,40 so that ionized particles having a large velocity component parallel to the z-axis advantageously strike either upper electrode 36 or lower electrode 40. This is advantageous because such misguided ions propagate slightly differently through the ion separation region 32 compared to other ions having the same charge-to-mass ratio, thereby degrading the performance of mass spectrometer 10.

The ionized particles, being positively charged, are initially repelled from positively biased edge 48 of center electrode 38. They are further pulled away from ionizer 30 by accelerating electrodes 54,56 which are maintained at negative electric potentials relative to center electrode 38. Ions that successfully pass between accelerating electrodes 54,56 proceed to separation region 32.

The small distance between ionizer 30 and detector 34, preferably on the order of 1 millimeter, permits a unique configuration of electromagnetic fields in separation region 32 to separate ions having different charge-to-mass ratios. Specifically, the small distance permits generation of a large electric field component $E_x$ along the x-axis in separation region 32 using a moderate level of electric potential.

A potential of about 300 V applied between accelerating electrodes 54,56 and detector 34 generates a field $E_x$ of 300,000 V/m. Preferably, permanent magnet 58 is disposed relative to mass spectrometer 10 to generate a magnetic field $B_{-y}$ directed along the negative y-axis in separation region 32. Magnet 58 can be a unitary C-shaped magnet, discrete magnets or tunable electromagnets. Magnetic field $B_{-y}$ acting on positively-charged ions moving in the positive x-direction will force such ions in circular arcs toward substrate 24.

Since ionizer 30 and detector 34 are positioned on substrate 24 at approximately the same height, a counteracting force is provided so that some of the ionized particles can reach detector 34. This is accomplished by application of an electric potential across conducting plates 60,62 to generate an independent electric field $E_z$, directed along the positive z-axis. Plate 60 is preferably a conductive coating applied to substrate 24 as shown in FIG. 1, but electrically isolated from substrate 24 by a thin insulating coating (not shown). Plate 60 is recessed in an etched depression on substrate 24 to reduce effects of mirror charges induced in plate 60 by the ionized particles. This also allows ionizer 30 and detector 34 to be at approximately the same height. Electrical connection to plate 60 is made by direct wire bonding or other suitable connectors. Plate 62 is held in place above plate 60 and parallel thereto by any appropriate techniques known to those skilled in the art. Plate 62 is preferably held as close as possible to plate 60 so that, conveniently, a low electric potential can be used to generate a strong field $E_z$. Electric field $E_x$ and electric field $E_z$ together form a resultant electric field having a magnitude of $\sqrt{(E_x^2+E_z^2)}$ and a direction in the x-z plane. The invention encompasses other known means for generating and providing adjustability of the electric field components $E_x$ and $E_z$. Accelerating field $E_x$, bending field $B_{-y}$, and offsetting field $E_z$ are preferably as spatially uniform as possible throughout separation region 32 to improve resolution, accuracy and linearity of mass spectrometer 10. This requirement is easier to satisfy in micromachined devices than in macroscopic devices because of the small dimensions involved.

Ion detector 34 receives ions which pass through separation region 32 in a manner such that the ions produce an electrical current in a conductor. Preferred ion detectors usable with the present invention have a high efficiency for ion collection, little variation due to high currents, and low sensitivity to the energy or mass of an incoming ion. One such detector is a Faraday Cup. As the name implies, this is a metallic cup-shaped electrode. With an ion trajectory aimed at the opening of the cup, Faraday's Law shows that the arriving charge experiences no net electrical field forces from charges already collected on the cup's surface. This results in sunstantially no degradation at high current levels in the collection efficiency of the detector.

Figure 3:
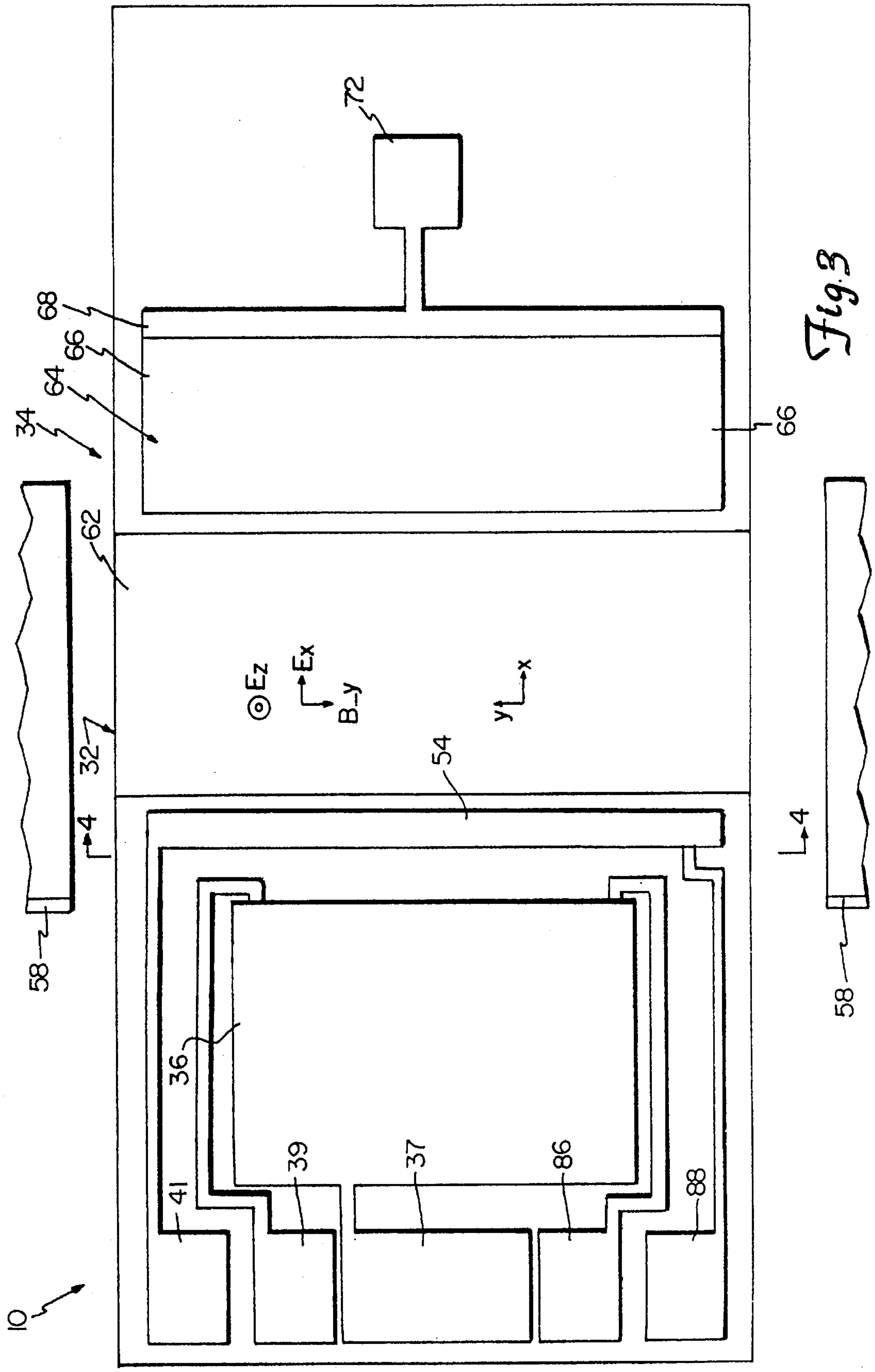
FIG. 3 is a top plan view of the mass spectrometer of FIG. 1.

Ion detector 34 includes elongated cup 64 which is essentially an elongated Faraday Cup. Cup 64 includes upper conductor 66 and lower conductor 68. A portion of upper conductor 66 is deposited directly onto lower conductor 68, providing a strong mechanical bond and galvanic contact. Another portion of upper conductor 66 is spaced apart from lower conductor 68, thereby forming cup region 70. Insulating layer 26 separates lower conductor 68 from substrate 24. Lower conductor 68 is coupled to electrical contact 72. The upper surfaces of conductors 66,68, visible from the perspective of FIG. 3, are coated with an electrically insulating layer, not shown, so that only ions striking detector 34 within cup region 70, rather than ions striking the exposed upper surfaces of detector 34, will contribute to the detector current. In operation, for a given setting of electric and magnetic fields and for a given physical layout of mass spectrometer 10, and single ionization condition, the ions collected in cup region 70 have substantially the same mass. Therefore, an electrical current detected at contact 72 is indicative of the amount of material in the final sample having a specified atomic mass unit (AMU).

Figure 2:
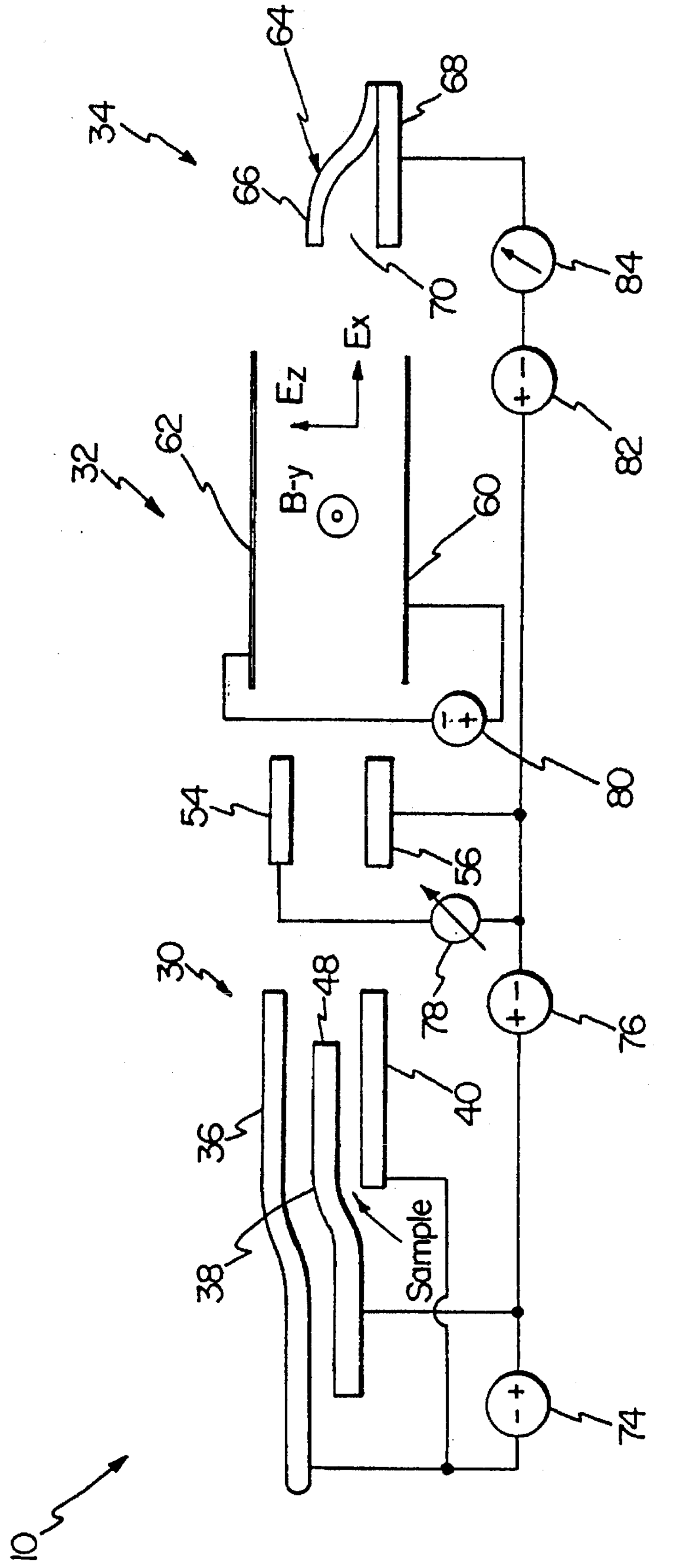
FIG. 2 shows electrical connections to the mass spectrometer of FIG. 1.

FIG. 2 is a schematic diagram showing electrical connections to micromachined mass spectrometer 10 of FIG. 1. Mass spectrometer 10 is configured to be a field ionization type mass spectrometer. In FIG. 2, a voltage source 74 is connected between center electrode 38 and upper and lower electrodes 36 and 40, respectively. Voltage source 74 maintains center electrode 38 at a higher electrical potential than electrodes 36 and 40. Voltage source 74 causes ionization of the sample gas as it passes edge 48 of central electrode 38 due to the high electric field at edge 48.

Voltage source 76 maintains accelerating electrodes 54 and 56 at a negative electric potential relative to electrode 38. This potential causes ionized particles to be extracted from ionizer 30 and drawn toward electrodes 54 and 56. Adjustable voltage source 78 establishes an electric potential between accelerating electrodes 54 and 56. Adjustable voltage source 78 allows the electric field between electrodes 54 and 56 to be adjusted to compensate for irregularities in ionizer 30. For example, voltage source 78 can be adjusted to compensate for differences in the spacing of electrodes 36 and 40 relative to sensor electrode 38. Furthermore, accelerating electrodes 54 and 56 may not be precisely centered relative to ionizer 30. In any case, adjustable voltage source 78 allows the electric field to compensate for manufacturing variations.

Voltage source 80 provides an electric potential between plates 60 and 62 to generate an electric field $E_z$ in the z direction. This electric field tends to counteract the tendency of the moving ions to bend in response to the magnetic field $B_{-y}$. Essentially, the $E_z$ field elongates the trajectory of the ions thereby magnifying the distance traveled in the x direction relative to the distance traveled in the z direction. In the configuration shown, the negative side of voltage source 80 is connected to upper plate 62 maintaining a negative potential relative to lower plate 60.

Voltage source 82 maintains a potential difference between elongated cup 64 and ionizer 30 and accelerating electrodes 54 and 56. The electric field $E_x$ in the x direction is due to voltage source 82. The magnitude of voltage source 82 controls the horizontal acceleration of ions in separation region 32. The negative terminal of voltage source 82 couples to cup 64 whereby $E_x$ is directed in the positive x direction.

Elongated cup 64 is connected to picoampmeter 84. Picoampmeter 84 measures the electrical current due to ions received in cup region 70. The magnitude of the current is indicative of the amount of matter from the fluid sample having a given molecular or atomic mass, the given mass being controlled by the strength and configuration of the electric and magnetic fields in separation region 32.

FIG. 3 is a top plan view of mass spectrometer 10 shown in FIG. 1. Upper electrode 36 connects to contact 37, contact 39 connects to center electrode 38, and contact 86 connects to lower electrode 40. Accelerating electrodes 54 and 56 connect to contacts 41 and 88.

In FIG. 3, permanent magnet 58 is positioned along sides of separation region 32 and provides the magnetic field $B_{-y}$. A top view of elongated cup 64 is also shown in FIG. 3. In another embodiment, magnet 58 can provide a variable magnetic field.

Figure 4:
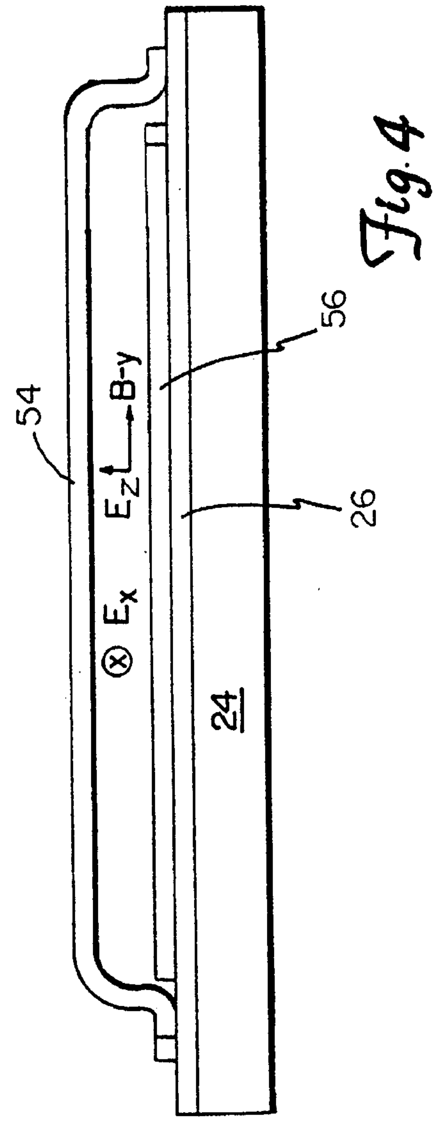
FIG. 4 is a cross-sectional view of a portion of the mass spectrometer of FIG. 3 taken along a line labeled 4—4.

FIG. 4 is a cross sectional view of FIG. 3 taken along the line labeled 4—4. FIG. 4 shows upper and lower accelerating electrodes 54,56 carried on substrate 24. Accelerating electrode 56 is separated from substrate 24 by insulating layer 26. FIG. 4 also shows the relationship between $E_x$, $E_z$ and $B_{-y}$.

Figure 5:
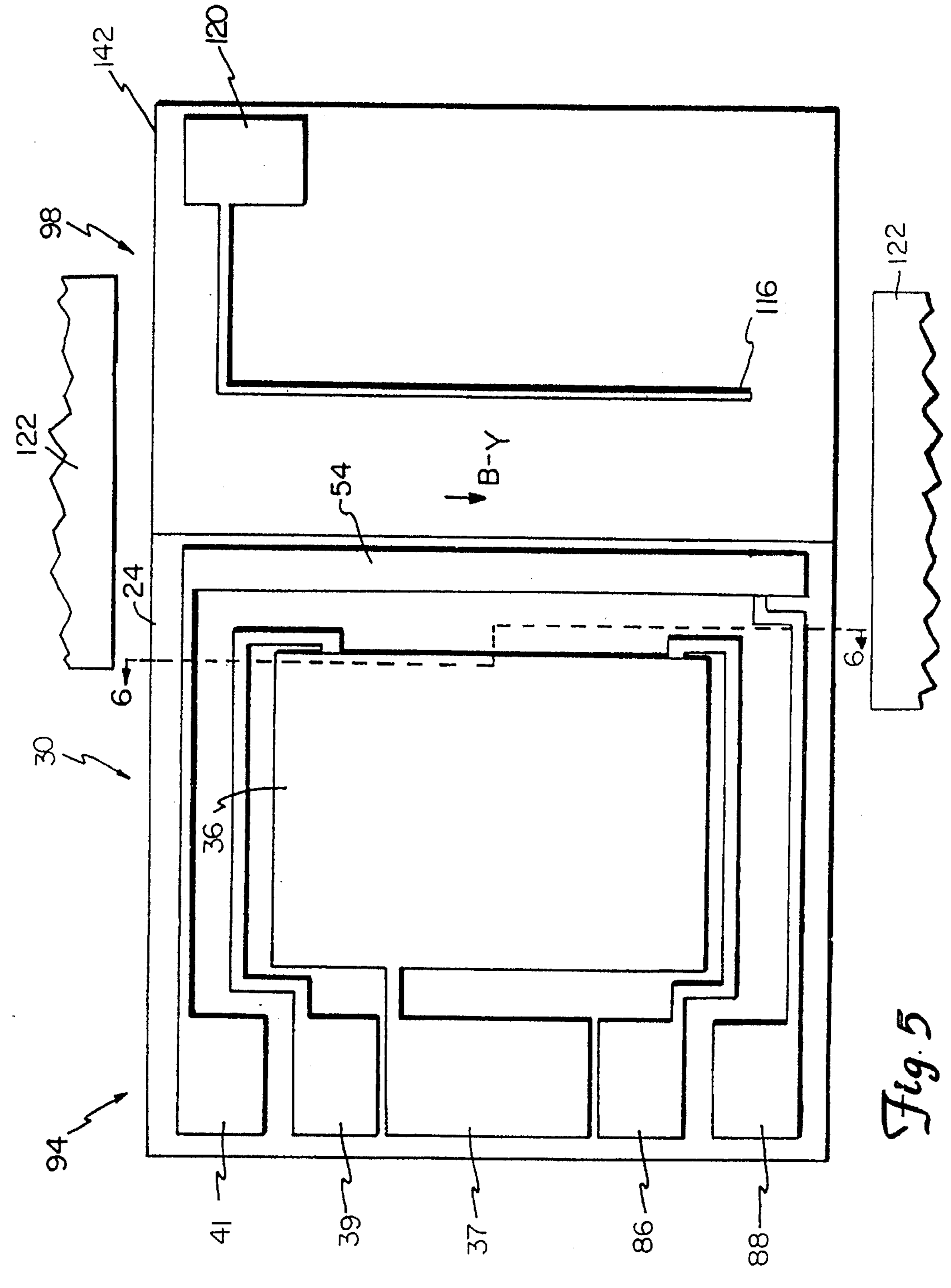
FIG. 5 is a top plan view of another embodiment of a mass spectrometer in accordance with the invention.

FIG. 5 is a top plan view of another embodiment of a micromachined mass spectrometer 94 in accordance with the invention. Mass spectrometer 94 includes ionizer 30 and ion detector 98. Ionizer 30 is substantially identical to ionizer 30 of mass spectrometer 10; reference numerals common to the figures identify similar features. Acceleration electrodes 52 and 54 are positioned in front of ionizer 30 to extract ionized particles from ionizer 30 and perform the same function as those of mass spectrometer 10.

Detector 98 uses a Faraday Cup consisting of an elongated channel 116, preferably having a v-shaped cross section, carried in substrate 142. Channel 116 is etched in substrate 142 and coated with a conductor. Channel 116 is electrically connected to contact 120. In the embodiment shown in FIG. 5, only the field $E_x$ $B_{-y}$ is used. Thus, in the absence of a counteracting field $E_z$, ions tend to turn more sharply downward. For this reason, channel 116 should be below the plane of ionizer 30 in order to receive ions. This is accomplished by provision of lower substrate 142, which carries channel 116 on its surface and which carries ionizer 30 atop relatively thick substrate 24. Ionizer 30 is therefore elevated above channel 116 by the thickness of substrate 24. It is understood that, if desired, $E_x$ and $E_z$ fields can be employed in a manner similar to that shown in FIGS. 1 through 4. FIG. 5 also shows magnet 122 to generate magnetic field $B_{-y}$ used to deflect ions.

Figure 6:
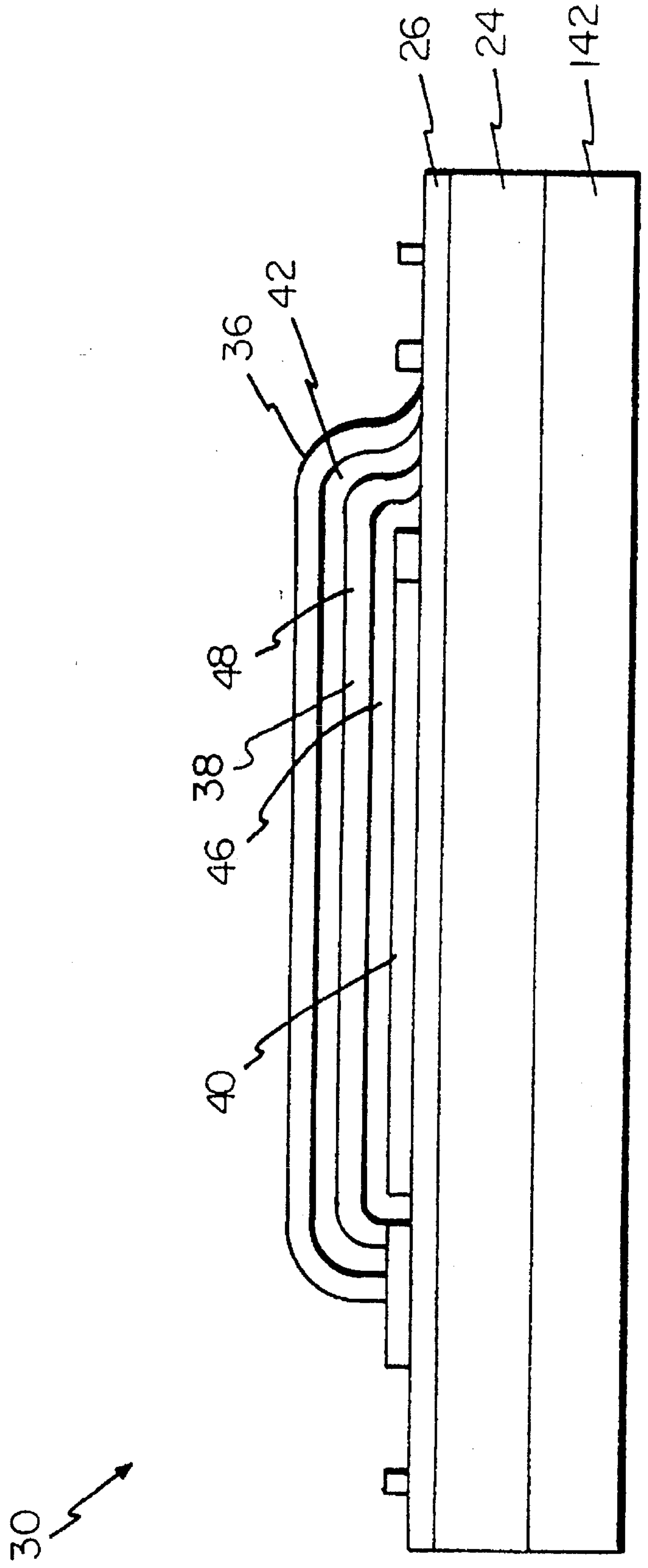
FIG. 6 is a cross-sectional view of the mass spectrometer of FIG. 5 taken along a line labeled 6—6.

FIG. 6 is a cross-sectional view of ionizer 30 shown in FIG. 5 taken along the line labeled 6—6. FIG. 6 shows gap 42 separating upper electrode 36 from center electrode 38. Passage 46 separates center electrode 38 from lower electrode 40. Ionizer 30 is carried on substrate 24, which in turn is carried on brittle substrate 142 and bonded thereto.

Figure 7:
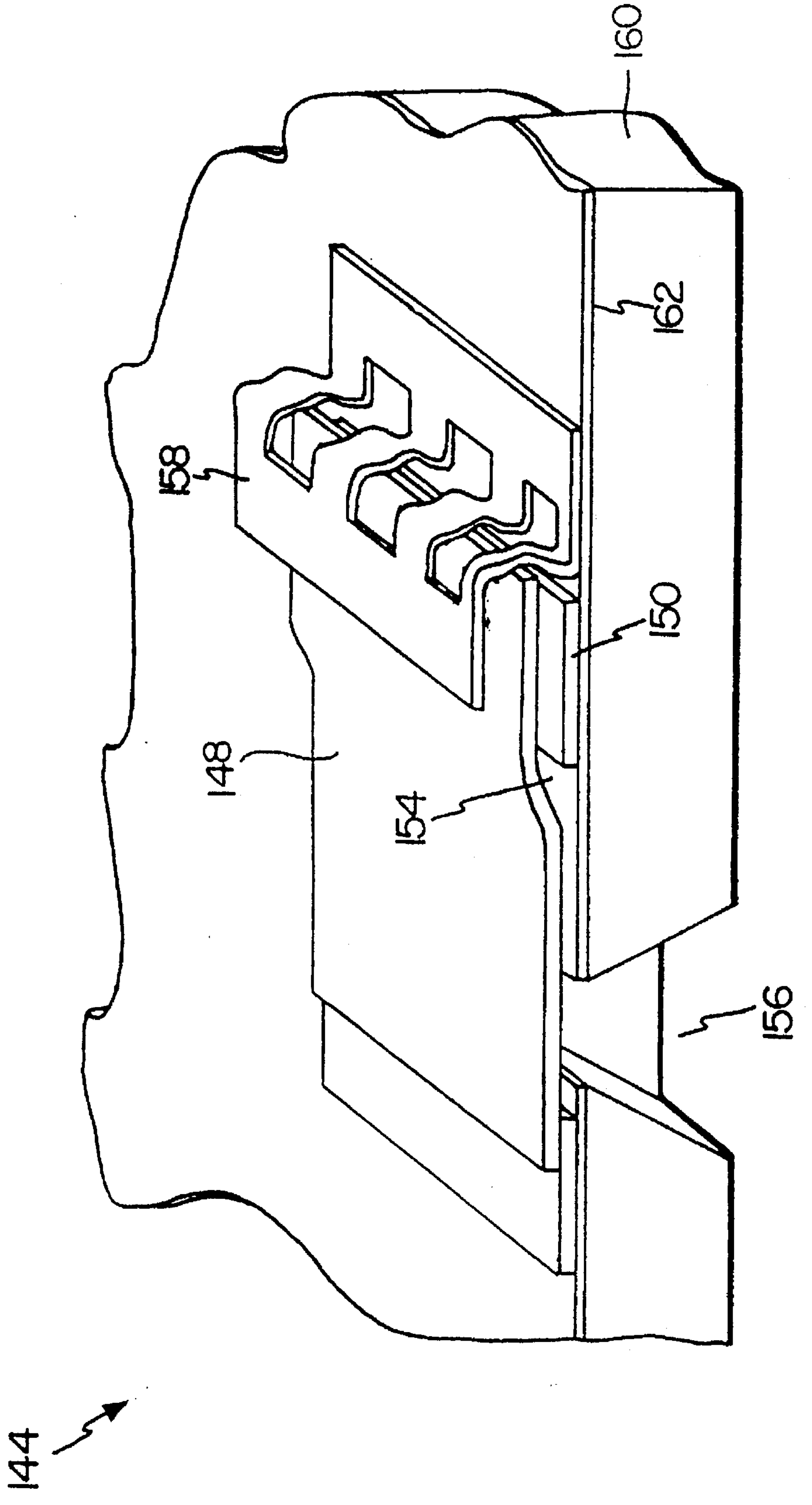
FIG. 7 is a cutaway perspective view of an ionizer in accordance with another embodiment of the invention.

FIG. 7 shows a cutaway perspective view of another embodiment of the invention. FIG. 7 shows a micromachined ionizer 144 including upper electrode 158, center electrode 148 and lower conductor 150. Upper electrode 158 is separated from center electrode 148 by a gap. Passageway 154 separates lower conductor 150 from center electrode 148 by a gap. Note that conductor 150 is not necessary for operation of ionizer 144. Passageway 154 is coupled to inlet 156 for receiving a gas sample. Upper electrode 158 is positioned at the edge of electrode 148. Ionizer 144 is carried on substrate 160 and separated from substrate 160 by insulation layer 162. Electrodes 148 and 158 are supported by downward sloping ends not shown in FIG. 7 but similar to the structure shown in FIG. 6.

Ionizer 144 functions in a manner similar to that of ionizer 30. In ionizer 144, the function of upper and lower electrodes 146,150 has been replaced by electrode 158 which has a grid structure. A potential applied between center electrode 148 and electrode 158 produces an electric field that is highly concentrated at the edge of electrode 148, but that is relatively weak at the arcuate inner surface of electrode 158 facing the edge of electrode 148. This causes ionization of the sample near the tip of electrode 148. The field between center electrode 148 and electrode 158 also draws ions from passageway 154. Openings in electrode 158 allow ions to pass through and beyond electrode 158 to accelerating electrodes 54,56.

The micromachined structures shown in FIGS. 1 through 7 are fabricated using standard fabrication techniques. For example, various layers of insulating and conducting materials are deposited using known deposition techniques. Portions of these layers are etched away using suitable etching techniques and are formed using standard masks, for example photoresist and sacrificial masks. Etching is through chemical etches, abrasive and ion milling techniques, and other suitable means.

FIG. 8 shows a cross-sectional view of a complete mass spectrometer system 164 in accordance with the invention. Mass spectrometer system 164 includes micromachined mass spectrometer 10 shown in FIG. 1. Mass spectrometer 10 is mounted on plate 20 and coupled to port 21. Port 21 is coupled to valves 166 which provide gas from source 168 under the control of valve controller 170.

Mass spectrometer 10 is coupled to controller 172 through electrical conductors 174. Controller 172 is coupled to valve controller 170 and display 176. Mass spectrometer 10 is covered by enclosure 178 which is evacuated by vacuum pump 180.

In operation, controller 172 controls valve controller 170 to trap a small volume (typically 1 to 10 nanoliters) of fluid sample from source 168 in channel 14, and then to release the sample to mass spectrometer 10. Controller 172 controls the electric fields and if desired, the magnetic field in mass spectrometer 10 and has circuitry to sense current from Faraday Cup 64, shown in FIG. 1. Controller 172 sweeps an electric field ($E_z$ or $E_x$, or a combination of $E_z$ and $E_x$) and monitors output from detector 64. Alternatively, the electric field can be changed only after integrating the received current at a given field setting from the time the nanoliter sample is released into the mass spectrometer to the time the nanoliter sample is exhausted. This technique of holding the fields constant for each complete sample taken increases accuracy of the measurement. The output of detector 64 at a given electrical field combination corresponds to the quantity of particles in the sample having a particular atomic mass unit. (Controller 172 controls voltage sources 74, 76, 78, 80 and 82 shown in FIG. 2 and monitors picoampmeter 84.) Controller 172 generates an output on display 176 showing atomic mass unit versus quantity of particles.

Vacuum pump 180 must provide a low-enough pressure for the ion system to operate properly and not induce noise or cause a loss of resolution to ion-gas collisions. The reduced size of the invention allows for a similar reduction in vacuum pumping requirements over prior art systems. The system must also possess sufficient pumping speed to maintain that pressure during the introduction of the sample gas, and its pumping characteristics must be such not to cause significant sample segregation. System cleanliness must be sufficient that unacceptable background signals are not present. Occasional baking at temperatures at or above 200° C. may be required. Turbo-molecular and ion pumping systems are the two best systems to fill these requirements. The turbo-molecular system is preferred because of its high pumping speeds for systems presently in use.

In brief, microvalve assembly 166 includes three microvalves, two at opposite ends and one in the center of sample volume channel 14. The end valves work in unison to allow flow through and leak-tight trapping of the atmospheric pressure sample volume. The center valve is connected to the inlet port of the ionizer. The center valve is normally closed to high vacuum leak tightness but, when the end valves are sealed, the center valve can be opened and the sample volume contained in the sample volume channel is then provided to the ion mass spectrometer. The center valve remains open until the entire sample volume is evacuated. To reduce sample separation error for both high and low viscosity samples, controller 172 monitors the time integral of the detected ion current over the entire nanoliter sample injection period, during which time the center valve is open. Alternately, controller 172 can rapidly scan the electric or magnetic fields during the sample injection period and simultaneously monitor the received detector current, thereby monitoring multiple AMU channels from the single nanoliter sample. The vacuum within the chamber is typically $1\times10^{-6}$ Torr.

An important design consideration for a field ionizer includes a high positive electrode area-to-ionize-volume ratio in order to maximize probability of the gas molecules contacting the emitting electrode and hence be ionized. It should also be noted that samples with high electric field susceptibilities will be preferentially drawn toward positively increasing electric fields. Since this is undesirable, the field ionizer of the present invention incorporates a predominantly uniform electric field in the ionizer away from the edge of the center electrode. In addition, since positively charged ions are attracted toward the negative electrode(s) of the ionizer, the field ionizer should include means for efficiently extracting the ions from the area of ionization, such as the accelerating electrodes discussed above.

Center electrode 38 is positively charged when operating as a field ionization device. However, ionizer 30 can be configured to operate as an impact ionization device by applying a negative potential between center electrode 38 and lower electrode 40. Because the distance between electrodes 38 and 40 is small, the potential causes a current to flow from electrode 40 to electrode 38 which impacts the sample flowing therebetween thereby ionizing the sample by electron impact. When operating as an impact ionization device, upper electrode 36 is not used.

Mass separation of the ionized gas molecules is achieved by acting on the ions with a combination of electric and/or magnetic fields and measuring the response of the ions to the fields. One known method first imparts a fixed kinetic energy to all the ions and then separates them by their momentum. The fixed kinetic energy (k) is obtained by applying a fixed potential (V) across a pair of accelerating electrodes according to the following equation:

$$k=qV=mv^2/2$$

The separation of the ions by momentum (p) is done by passing the ions through a magnetic field perpendicular to their velocity (v) and then isolating those having a particular radius (r) of curvature of their flight in the plane perpendicular to the magnetic field according to the following equation:

$$p=mv=qrB$$

Solving these two equations for the traditional charge-to-mass ratio separation technique, the following equation is realized:

$$q/m=2V/(rB)^2$$

By manipulation of V, r and B, a wide variety of geometries is possible.

One aspect of the present invention includes the application of three fields in the separation region: an accelerating field ($E_x$), a bending magnetic field ($B_{-y}$) and a counteracting electric field ($E_z$) which counteracts the effects of the magnetic field $B_{-y}$. This provides a device which is a momentum selector with an integral accelerator. At least the magnetic field $B_{-y}$ and the counteracting electric field $E_z$ are substantially uniform through the separation region due to the small dimensions of the invention. Typically, an accelerating field of about 300,000 volts/meter is required. In a macroscopic device, this requires at least a 30,000 volt precision power supply. However, in the present invention, such a field strength can be achieved with a 300 volt supply (at voltage source 82) because the separation region has an extent of only about 1 millimeter. Furthermore, in such a micromachined mass spectrometer, a 1 Tesla magnetic field can be supplied by a permanent magnet.

A computer model was constructed to simulate the motion of ions through the separation region. The model assumed uniform $E_x$, $E_z$and $B_{-y}$ fields, and allowed the use of an initial velocity vector so that thermal effects could be studied. The model indicated that accurate measurements are achieved on a device similar to mass spectrometer 10 if the ion source and ion detector are positioned about 1,000 micrometers apart. With $B_{-y}$ 1 Tesla and $E_x$ equal to 300,000 volts/meter, $E_z$ of 7,975 volts/meter, a 10 micrometer spacing (along the x-axis) per AMU was obtained for a 100 AMU selection. Further, the resolution of the device using an $E_z$ field does not show the typical square root relationship of known momentum separators. The computer model showed that there was a linear relationship between distance traveled in the X direction as a function of ion mass. By providing an integral accelerator with a momentum separator, the traditional square root relationship is avoided, resulting in higher resolution. Thus, if first and second charge-to-mass ratios (CMR) are chosen by adjustment of one or more of the fields, the CMR values being related by a factor X, and the ion detector has a first resolution at the first CMR value and a second resolution at the second CMR value, the ratio between the first resolution and the second resolution is less than the square root of X and preferably no greater than $\frac{1}{2}(1+\sqrt{X})$. Further, the model showed that initial thermal velocity had a relatively small impact on sensitivity.

The ion detector electrical current is proportional to the conductance of the sampled gas. Where the passage 46 is a channel 5 micrometers wide by 1500 Å high by 30 micrometers long, and where the inlet pressure us one atmosphere and the outlet pressure is a high vacuum, the conductance is approximately $2.8\times10^{-6}$ liters per second. This is equivalent to $1.2\times10^{-7}$ mols of gas per second which is $8\times10^{16}$ gas atoms per second. With an ionization efficiency of 1:10000, a full-scale signal of 1.28 microamperes will result. With suitable electronics, e.g. picoampmeter 84 along with a signal integrator, a pico ampere signal is easily detected which would give better than 1 ppm sensitivity. A typical distance between the ionizer and the ion detector is less than 10 centimeters. This provides high field density relative to applied potential.

The ions are separated by their charge-to-mass ratio by one of two possible methods described above and are then collected by the ion detector. In a design based on a traditional momentum separator (e.g., FIG. 5), the field ionization device is close coupled to an accelerating electrode with an aperture for the ion to pass therethrough. An accelerating electrode is provided in this design to give the ions their initial kinetic energy. The small space between the ionizer and the accelerator make effects of an inhomogeneous magnetic field insignificant. In the absence of a counteracting $E_z$ field and integral accelerating $E_x$ field, the ion trajectory is circular in the separation region. The ions move along arcs dictated by their charge-to-mass ratio toward the surface of substrate 142, which can be disposed 1000 micrometers below the ionizer/accelerator atop substrate 24. Substrate 142 can carry one or more Faraday Cup collectors to detect the ion currents. Ions having a sufficiently high charge-to-mass ratio, having a radius of curvature less than 500 micrometers (half the vertical distance from the accelerator to substrate 142) will impact the side wall of substrate 24, so the acceleration voltage must vary to allow collection of the full range of mass values. The range of acceleration potential is 47 volts for 1 AMU to 0.47 volts for 100 AMU. The spatial separation is between the ionizer the accelerating electrodes 5 micrometers. This will result in a tolerance of 5 meters per second thermal velocity to meet the resolution criteria.

A design based on the acceleration method (i.e, mass spectromer 10) does not require a close coupled accelerating electrode. Instead, parallel plates to the left and right of the ionizer and detector in FIG. 1, respectively, can create the accelerating field. A set of parallel plates above and below can create the deflecting field $E_z$ which counters the effects of the magnetic field perpendicular to both electric fields. The ion trajectory is a skewed parabola originating at the ionizer and ending at the ion detector 1000 micrometers away from the ionizer and in the same plane as the ionizer. Alternately, the ion detector can be positioned above or below the plane of the ionizer. Because of the conductivity of the Faraday Cup, the deflecting electric field ends at the detector. This means only one detector can be used without disturbing the trajectory of the ions. Both the end point of the ion trajectory and the apogee of the ion flight can be adjusted by adjustment of one or all of $E_x$, $E_z$ and $B_{-y}$ . However, preferably $E_z$ is adjusted. In a preferred embodiment, with a spacing of 100 micrometers between plates 60 and 62, 10 micrometers between ionizer 30 and accelerating electrodes 54,56 and 1000 micrometers between ionizer 30 and detector 34, voltage sources 76 and 82 values of 300 volts and voltage source 80 has a range in value of 79 to 0.79 volts for 100 to one AMU.

The $E_x$, $E_z$, and $B_{-y}$ fields have been described as uniform. However, this is merely an ideal and it is understood that uniform fields may be impractical. Steps to achieve uniform fields include making magnet 58 and electrodes 62 and 60 large relative to spectrometer 10. Additionally, spectrometer 10 is relatively small, the spacing between ionizer 30 and detector 34 should not exceed 5 centimeters.

Although the present invention has been described with reference to preferred embodiments, workers skilled in the art will recognize that changes can be made in form and detail without departing from the spirit and scope of the invention.

What is claimed is:

1. A device for ionizing at least a portion of a fluid sample, the device comprising:

a substrate having a substantially planar surface;

a first electrode carried by the planar surface and having an edge a second electrode carried by the planar surface; and wherein the second electrode has a portion spaced-apart from the substrate, the portion being positioned proximate the first electrode such that an electric potential applied across the first and second electrodes ionizes a portion of the fluid sample proximate the edge.

2. The device of claim 1, further comprising:

a source of electric potential electrically coupled to the first and second electrode to produce an electric field therebetween, thereby to ionize the fluid sample portion.

3. The device of claim 1 including means for accelerating ions in a direction away from the edge.

4. The device of claim 3 wherein the means for accelerating comprises a pair of acceleration electrodes.

5. The device of claim 4 including means for applying a potential difference between the pair of acceleration electrodes.

6. The device of claim 1 including an electrode grid proximate the edge of the first electrode.

7. The device of claim 1 including a third electrode proximate the first electrode wherein the first electrode is positioned between the second and third electrodes, the third electrode being disposed proximate the first electrode such that an electric potential applied across the first and third electrodes ionizes a portion of the fluid sample proximate the edge.

8. A device for ionizing at least a portion of a fluid sample, the device comprising:

a substrate having a substantially planar surface;

a first and second electrode carried by the planar surface;

wherein the first electrode has a portion spaced-apart from the substrate, the portion being positioned proximate the second electrode such that an electric potential applied across the first and second electrodes ionizes said at least a portion of the fluid sample; and wherein at least a portion of the second electrode is adjacent to the fluid sample and positioned between the first electrode and the substrate.

9. The device of claim 8, further comprising:

a third electrode carried by the substrate and disposed at least partially between the portion of the second electrode and the substrate, the first, second, and third electrodes being disposed such that an electric potential applied therebetween ionizes a portion of the fluid sample proximate the portion of the second electrode.

10. The device of claim 9, wherein the first, second, and third electrodes comprise strips of electrically conductive material held in substantially parallel relation to the substrate.

11. The device of claim 10, wherein the first, second, and third electrodes have first, second, and third edges, respectively, wherein the first and third edges are aligned with each other, and wherein the second edge is recessed between the first and third electrodes.

12. The device of claim 8 including means for accelerating ions in a direction away from the first and second electrodes.

13. A mass spectrometer for analyzing a sample composed of particles having particle masses, the spectrometer comprising:

a substrate;

an ionizer receiving the sample and ionizing at least some of the particles, the ionized particles having charge-to-mass ratios;

an ion detector disposed on the substrate to receive a portion of the ionized particles from the ionizer, the ion detector being separated from the ionizer by a region of space through which the ionized particles travel;

a plurality of field generators which generate an electric and magnetic field in the region of space; and wherein the electric and magnetic fields cause the ionized particles to strike the substrate at zones positioned on the substrate substantially in proportion to the charge-to-mass ratios of the ionized particles.

14. A method for analyzing a sample composed of particles having particle masses, comprising the steps of:

ionizing at least some of the particles with an ionizer, the ionized particles having charge-to-mass ratios;

collecting a portion of the ionized particles at an ion detector, the portion being those ionized particles which have a value of charge-to-mass ratio (CMR) within a resolution limit of a desired charge-to-mass ratio, the ion detector being separated from the ionizer by a region of space through which the ionized particles travel;

providing at least one of an electric field and a magnetic field in the region of space;

selecting the desired charge-to-mass ratio from a first and second CMR value by adjusting the at least one of an electric field and a magnetic field, the ion detector resolution limit having a first and second limit value corresponding to the first and second CMR value, respectively;

wherein the first CMR value is equal to the second CMR value multiplied by a factor "X", X having a value greater than one; and wherein the at least one of an electric field and a magnetic field is arranged such that a ratio of the first limit value to the second limit value is less than the square root of X.

15. The method of claim 14 wherein the ratio of the first limit value to the second limit value is no greater than $\frac{1}{2}(1+\sqrt{X})$.

16. A mass spectrometer, comprising:

a micromachined ionizer;

a micromachined ion detector; and a substrate holding the ionizer and the ion detector in a spaced-apart relationship.

17. The mass spectrometer of claim 16, wherein the ionizer is a field ionizer.

18. The mass spectrometer of claim 16, wherein the substrate carries at least one of the ionizer and the ion detector.

19. The mass spectrometer of claim 18, further including a second substrate carrying the ionizer, wherein the first-named substrate carries the ion detector and the second substrate.

20. The mass spectrometer of claim 16 wherein the spacing between the ionizer and the ion detector is less than 10 centimeters.

21. The mass spectrometer of claim 20, wherein the spacing is on the order of 1 millimeter.

22. The mass spectrometer of claim 16, further comprising:

a field generator generating a field in a path between the ionizer and the ion detector;

wherein the ion detector detects ionized particles having a desired charge-to-mass ratio (CMR) and does not substantially detect ionized particles having CMRs substantially different from the desired CMR.

23. The mass spectrometer of claim 22, wherein the field generator has an adjustment capability to adjust the field such that the ion detector detects ionized particles having a second desired CMR different from the first-mentioned desired CMR.

24. The mass spectrometer of claim 16, further comprising a valve apparatus coupled to the substrate to introduce a controlled amount of sample to the ionizer.

25. A mass spectrometer, comprising:

an ionizer;

a substrate adjacent the ionizer, the substrate formed from a brittle material; and an ion detector micromachined from the substrate to detect ions from the ionizer.

26. The mass spectrometer of claim 2, wherein the micromachined ion detector includes a conductive layer on the substrate to intercept the ions.

27. A method of fabricating a mass spectrometer, comprising the steps of:

providing a first and second substrate;

forming an ionizer on the first substrate and an ion detector on the second substrate.

28. The method of claim 27, wherein the forming step comprises a process selected from the group consisting of photolithography, chemical etching, vitreous molding, evaporation, sputtering, and photoshaping.

29. A method of fabricating a mass spectrometer, comprising the steps of:

providing a first and second substrate;

forming an ionizer on the first substrate and an ion detector on the second substrate; and coupling the first substrate to the second substrate to establish a predetermined separation between the ionizer and the ion detector.

30. The method of claim 29, wherein the coupling step comprises placing the first substrate atop the second substrate.

31. A device for ionizing at least a portion of a fluid sample, the device comprising:

a substrate;

a first electrode carried by the substrate and having an edge elongated along a line substantially parallel to the substrate and adjacent to the fluid sample;

a second electrode carried by the substrate; and a third electrode proximate the first electrode wherein the first electrode is positioned between the second and third electrodes, the third electrode being disposed proximate the first electrode such that an electric potential applied across the first and third electrodes ionizes a portion of the fluid sample proximate the edge.

32. A device for ionizing at least a portion of a fluid sample, the device comprising:

a substrate;

a first and second electrode carried by the substrate; and a third electrode carried by the substrate and disposed at least partially between a portion of the second electrode and the substrate, the first, second, and third electrodes being disposed such that an electric potential applied therebetween ionizes a portion of the fluid sample proximate the portion of the second electrode.

* * * * *